United States Patent [19]

Betts et al.

[11] 4,165,509

[45] Aug. 21, 1979

[54] DUAL LIQUID LEVEL MONITOR

[75] Inventors: Donald J. Betts, St. Charles; Martin W. Hamilton, Arlington Heights, both of Ill.

[73] Assignee: Eaton Corporation, Cleveland, Ohio

[21] Appl. No.: 827,297

[22] Filed: Aug. 24, 1977

[51] Int. Cl.² ............................................. G08B 21/00
[52] U.S. Cl. .................................. 340/620; 340/605; 73/304 R
[58] Field of Search ................ 340/59, 620, 605; 73/304 R; 222/47

[56] References Cited

U.S. PATENT DOCUMENTS 3,694,804  9/1972  Hill ............................................. 340/59
3,978,463  8/1976  Kerscher ................................. 340/244 C Primary Examiner—John W. Caldwell, Sr.
Assistant Examiner—Daniel Myer
Attorney, Agent, or Firm—R. J. McCloskey; R. A. Johnston; E. Crist

[57] ABSTRACT

A liquid level monitoring system functions by applying an alternating voltage to a probe. When the liquid level in a reservoir touches the probe, a low impedance to ground is present, thereby permitting current to flow to ground. When the liquid level falls below the probe, a high impedance to ground is created and current flows to a detector. The detector switches on an alarm which flashes an appropriate warning.

9 Claims, 2 Drawing Figures

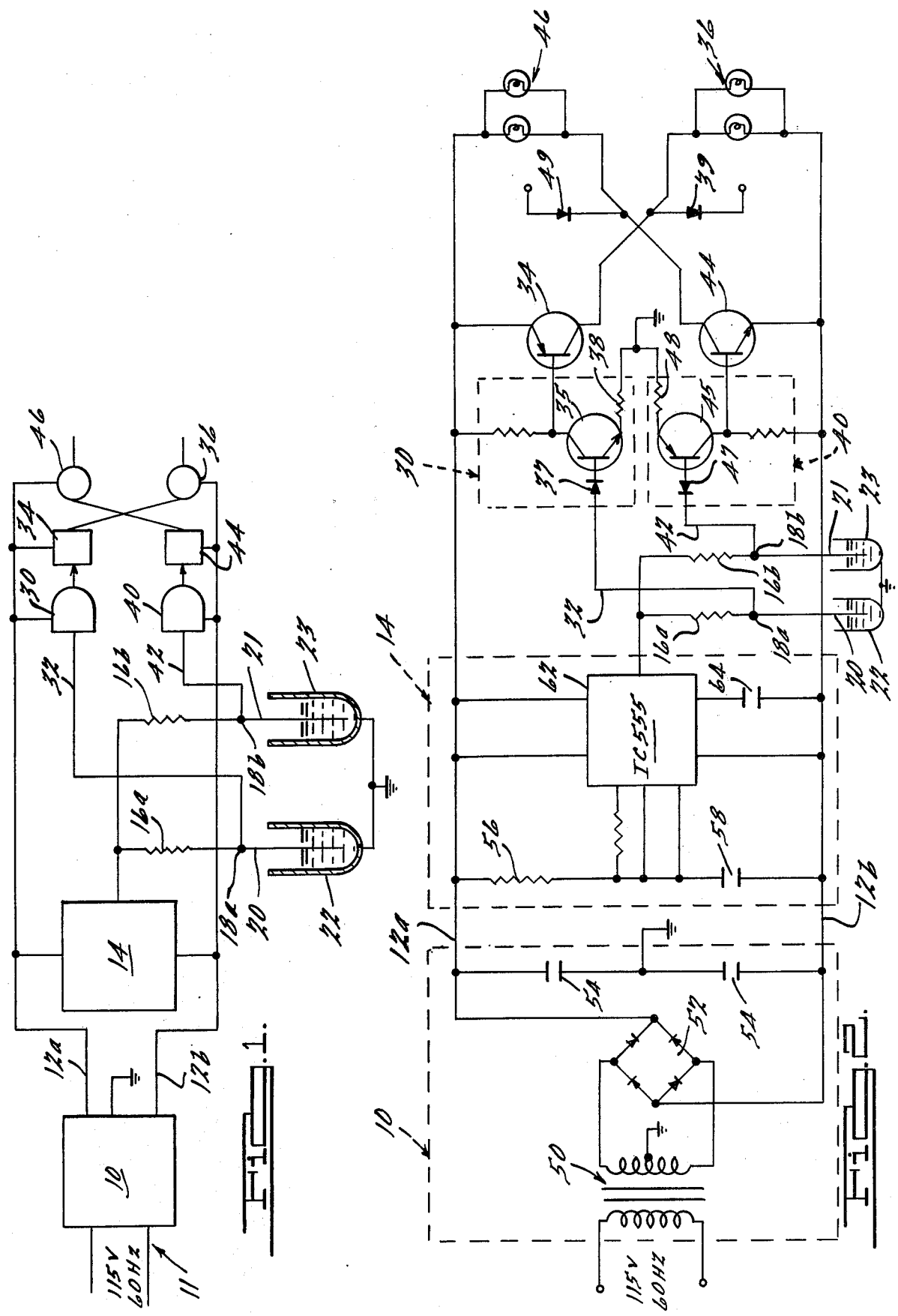

DUAL LIQUID LEVEL MONITOR

BACKGROUND OF THE INVENTION

1. Field of the Invention

In one aspect, this invention relates to devices for sensing the level of liquid in a container.

2. Description of the Prior Art

Prior art liquid level sensing devices have applied a direct current to a transformer, circuit board, and lamp driver system which are connected to a probe in a reservoir to be monitored.

The prior art systems applied a direct current to the probe which caused electrolytic action at the probes. The electrolytic action causes the deposition of material on the probe or dissolving of the probe. As a result, prior art probes required periodic cleaning or replacement.

Further, the prior art probes all required an individual circuit system for each probe monitored. Thus, prior art probes required expensive circuit parts for each probe.

SUMMARY OF THE INVENTION

A feature of this invention is the provision of a square wave on a sensing probe suspended within a reservoir to prevent corrosion or fouling of the probe.

A further feature of this invention is the driving of two probes by the square wave, each probe having a sensing circuit connected therewith which is responsive to only one-half of the square wave thereby allowing the use of a single transformer as power source for two probes. This reduces the cost of the system by using the most expensive parts of the circuit to bias two electrodes.

As yet a further feature, a relay can be incorporated in the monitor circuit to prevent withdrawal of liquid from the reservoir when the reservoir is depleted.

BRIEF DESCRIPTION OF THE DRAWING

In the accompanying drawing:

FIG. 1 represents a partial block diagram of one embodiment of this invention; and FIG. 2 shows a full schematic diagram of one circuit useful in the blocks of FIG. 1.

DETAILED DESCRIPTION OF THE PREFERRED EMBODIMENT

The system of the FIG. 1 shows an AC power supply 10 connected to a standard 115 volt, 60 Hz electrical line 11. The power supply 10 provides a reduced DC voltage which supplies power via lines 12a and 12b to a square wave generator 14.

The direct current voltage enters the square wave generator 14 and exits as a square wave which is fed through a pair of equal value parallel resistors 16a and 16b connected to nodes 18a and 18b. Two probes 20, 21 are attached to the nodes and extend into associated grounded reservoirs 22 and 23 respectively. The reservoirs 22, 23 are adapted to hold a quantity of liquid to be withdrawn and dispensed. Examples of suitable liquids include reconstituted fruit juice, juice concentrate, or beverage syrups. There will be an electrical impedance between the probe and its grounded reservoir which varies as the liquid levels in the reservoir change.

In general, when the liquid in the reservoir no longer contacts the associated probe, the impedance between the probe and associated reservoir will rise markedly and the voltage at the associated node will also rise. As the impedance increases, it activates a sensing switch passing a current to a lamp driver which lights bulb.

As shown, there are two sensing switches 30, 40 which are connected to the nodes 18a, 18b by associated lines 32 and 42. Sensing switch 30 is designed to open near a voltage of +6 volts at node 18a so that it lights a lamp 36 during the positive phase of the square wave. The other sensing switch 40 is activated by the negative phase of the wave and lights lamp 46 only during the negative phase of the wave. Because the sensing switches pass current only during a portion of the cycle, the lamps will flash intermittently clearly warning which reservoir is depleted.

Referring to FIG. 2, a more detailed circuit useful in the practice of this invention is shown. The conventional source of power, such as 115 volt, 60 Hz line power is supplied to the power supply 10 comprising a transformer 50 which steps down the voltage, for example to 12 volts AC, and a diode bridge 52 which provides full wave rectified plus and minus power to a pair of smoothing capacitors 54. This power supply 10 provides unregulated positive and negative 6 volts to the square wave generator circuit 14. Because of the sensing means described hereinafter, only one expensive transformer and diode bridge is needed to power two probes.

The square wave generator circuit 14 shown in FIG. 2 uses a commonly available integrated circuit 62 normally referred to as a "555 Timer" and generally available from several manufacturers. Capacitors 58 and 64, a 10 microfarad capacitor and a 0.01 microfarad capacitor, respectively, combine with the 220K ohm resistors 16a and 16b to provide a fifty percent duty cycle. The result is a square wave with a frequency of one Hertz. The square wave is impressed on the nodes 18a and 18b and thereby the probes 20 and 21. The frequency could be faster or slower but frequencies on the order of about 1–10 Hertz provide a good flashing effect when the lamps 36 and 46 are driven by one-half the wave.

As long as liquid in the tanks 22, 23 partially immerses the probes 20, 21, the square wave current is conducted from the probe to ground through the liquid. This effectively maintains the transistors in sensing switches 30 and 40 in a cut-off condition and maintains the lamp driver and indicator portions of the circuit quiescent. When the liquid no longer conducts the square wave current to ground, the square wave current will repeatedly pulse the transistors from a cut-off to an on condition which in turn furnishes a base current to lamp driver transistors 34 and 44. Diodes 37 and 47 provide a blocking function to protect the switching transistors 35, 45 and prevent the base emitter junction of transistors 35, 45 from seeing a potentially damaging reverse voltage.

Resistors 16a and 16b provide a buffering or isolation back to the square wave generator output and between probes 20, 21 when one probe is grounded. The resistors also control the base current to the associated transistors when a probe is not grounded.

A pair of conventional 10K collector load resistors 38 and 48 provide emitter bias resistance for their associated switching transistors 35, 45 maintaining them in the cut-off condition when the probes are grounded. The collector load resistors of sensing switches 30, 40 limit base currents to the lamp driver transistors 34, 44 when the switching transistors are activated.

The lamp driver circuits comprise the driving transistors 34, 44 each of which remains in the cut-off state as long as its associated probe is grounded. Current passed to one of the driving transistors 34, 44 by switching transistors 35, 45 will be amplified which in turn causes a light to flash. As shown, the circuit which monitors probe 20 reacts to the positive phase of the wave and the other probe 21 and circuit reacts to the negative phase of the wave thereby discriminating which reservoir is empty. Because only one-half the wave is used, the light will flash slowly. When both reservoirs are empty, the indicators will flash alternately. As shown, there are two light bulbs attached to the lamp driver transistors. In many applications it is desired to have two lights, one on each side of a dispenser so that an empty reservoir could be noted from either side of the dispenser.

Associated with each light 36, 46 are diodes 39 and 49 which could be attached to optional latching relays to provide relay means for automatically shutting off an associated dispensing station when one of the reservoirs is emptied.

What is claimed is:

1. A device for sensing the liquid level in a plurality of reservoirs each normally containing a quantity of a liquid to be dispensed, said device comprising:
   A. an electrical sensing probe suspended within each of said reservoirs;
   B. means defining an electrical circuit passing through each of said probes and through the liquid in the respective said reservoir to ground;
   C. means for applying a common alternating current to each of said probes to set up an alternating current flow in said circuit; and
   D. means sensing the impedance in each of said circuits and operative in response to a change in said impedance in any of said circuits caused by the liquid level dropping below the lower end of said probe, to activate a warning device to call attention to such low liquid level.

2. A device for sensing the liquid level in a plurality of reservoirs each normally containing a quantity of liquid to be dispensed, said device comprising:
   A. an electrical sensing probe suspended within each of said reservoirs for passing a current through the liquid to ground;
   B. signal generating means adapted to generate an alternating wave of a predetermined amplitude which is applied to each of said probes;
   C. means operative to sense the impedance change between each of said probes and its associated ground, said sensing means sensing a first voltage when the liquid in each of said reservoirs is above the lower end of each of said probes and sensing a second voltage when the liquid level falls below the lower end of each of said probes;
   D. switching means operative in response to sensing of said second voltage to pass a current during a selected one-half of the generated wave; and
   E. warning means activated only by the current passing through said switching means during the selected one-half wave.

3. A device according to claim 2, wherein said signal generating means applies the alternating wave to two probes, each of said probes being suspended within an associated reservoir and each probe having sensing means associated therewith, one of said sensing means responding to the positive phase of said alternating wave and the other of said sensing means responding to the negative phase of said wave, whereby warning means associated with each of said sensing means will be activated by only a portion of said wave thereby discriminating which reservoir has a lowered liquid level.

4. A level sensing device according to claim 2, wherein said wave generating means produces a wave of about 1 to 10 Hertz thereby producing a slowly pulsed warning signal.

5. A level sensing device according to claim 2, further comprising a relay means adapted to prevent the withdrawal of liquid from the reservoir, said relay being activated by the sensing means associated with the reservoir when the liquid level falls below the lower end of the probe.

6. A level sensing device according to claim 2, wherein said signal generating means generates a continuous alternating wave.

7. A device for sensing the liquid level in two reservoirs each normally containing a quantity of liquid to be dispensed, said device comprising:
   A. an electrical sensing probe suspended within each of said reservoirs for passing a current through the liquid to ground;
   B. signal generating means adapted to generate an alternating wave of a predetermined amplitude which is applied to each of said probes;
   C. sensing means associated with each of said probes and operative to sense the impedance change between each of said probes and its associated ground, one of said sensing means responding to the positive phase of said alternating wave, and the other of said sensing means responding to the negative phase of said wave;
   D. switching means operative in response to sensing of said second voltage to pass a current during a selected one-half of the generated wave; and
   E. warning means associated with each of said sensing means, each of said warning means being activated by only a portion of said wave for detecting which of said reservoirs has a lowered liquid level.

8. A level sensing device according to claim 7, wherein said wave generating means produces a wave of about 1 to 10 Hertz thereby producing a slowly pulsed warning signal.

9. A level sensing device according to claim 7, further comprising a relay means adapted to prevent the withdrawal of liquid from the reservoir, said relay being activated by the sensing means associated with the reservoir when the liquid level falls below the lower end of the probe.

* * * * *